United States Patent
Chen et al.

(10) Patent No.: US 9,696,209 B2
(45) Date of Patent: Jul. 4, 2017

(54) METHOD FOR MEASURING TEMPERATURE OF FILM IN REACTION CHAMBER

(71) Applicant: Advanced Micro-Fabrication Equipment Inc, Shanghai, Shanghai (CN)

(72) Inventors: Lu Chen, Shanghai (CN); Chaoqian Zhang, Shanghai (CN); Yanzhong Ma, Shanghai (CN); Yousen Li, Shanghai (CN); Zhehao Chen, Shanghai (CN); Steven Tianxiao Lee, Shanghai (CN)

(73) Assignee: ADVANCED MICRO-FABRICATION EQUIPMENT INC, SHANGHAI, Shanghai (CN)

(*) Notice: Subject to any disclaimer, the term of this patent is extended or adjusted under 35 U.S.C. 154(b) by 428 days.

(21) Appl. No.: 14/333,477

(22) Filed: Jul. 16, 2014

(65) Prior Publication Data
US 2015/0025832 A1    Jan. 22, 2015

(30) Foreign Application Priority Data

Jul. 17, 2013    (CN) .......................... 2013 1 0302419

(51) Int. Cl.
G01J 5/00    (2006.01)

(52) U.S. Cl.
CPC .................. G01J 5/0007 (2013.01)

(58) Field of Classification Search
CPC ....................................................... G01J 5/0007
USPC ........................................................ 702/134
See application file for complete search history.

(56) References Cited

U.S. PATENT DOCUMENTS

| | | | |
|---|---|---|---|
| 2010/0246631 A1* | 9/2010 | Barlett | G01J 5/02 374/2 |
| 2012/0327970 A1* | 12/2012 | Haw | G01J 5/06 374/121 |

\* cited by examiner

*Primary Examiner* — Ricky Ngon
(74) *Attorney, Agent, or Firm* — Womble Carlyle Sandridge & Rice LLP; Joseph Bach, Esq.

(57) ABSTRACT

A method for measuring a temperature of a film in a reaction chamber is provided. The method includes: obtaining reflectivity sampling data R of a sampling point set in a detection area of the film for light with a wavelength $\lambda$, and thermal radiation value sampling data E of the sampling point set; obtaining a first correction factor $\alpha$ and a second correction factor $\gamma$ according to values of at least two sampling data groups, wherein $0<\alpha\leq 1$, $0\leq\gamma\leq 1$; obtaining a blackbody radiation value $L_b$ of the detection area of the film for the light with the wavelength $\lambda$ according to the first correction factor $\alpha$, the second correction factor $\gamma$ and the values of the at least two sampling data groups; obtaining a temperature T of the detection area by looking up a table according to the blackbody radiation value $L_b$ and the wavelength $\lambda$.

12 Claims, 4 Drawing Sheets

METHOD FOR MEASURING TEMPERATURE OF FILM IN REACTION CHAMBER

This application claims priority to Chinese Patent Application No. 201310302419.8, entitled "METHOD FOR MEASURING TEMPERATURE OF FILM IN REACTION CHAMBER", filed with the Chinese Patent Office on Jul. 17, 2013, which is incorporated by reference in its entirety herein.

FIELD OF THE TECHNOLOGY

The application relates to the field of semiconductor manufacturing technology, and in particular, to a method for measuring a temperature of a film in a reaction chamber.

BACKGROUND

With a miniaturization of semiconductor device, various semiconductor films are more and more used in the semiconductor device, and the requirements for parameters of the semiconductor films are increasingly strict. The parameters mainly include a thickness, temperature and reflectivity of the semiconductor film.

During a growth of the semiconductor film, usually a surface temperatures of the film need to be measured. In an existing technology, the temperature of the film may usually be measured and calculated by following formula:

$$E=(1-R)\times L_b(\lambda,T) \quad (1)$$

Where in the formula (1), E is a thermal radiation value of the film, R is a reflectivity of the film for a light with a wavelength $\lambda$, $L_b(\lambda, T)$ is a value of blackbody radiation of the light with the wavelength $\lambda$ in the reaction chamber at a temperature T.

However, during the growth of a film, with the changing of film thickness, an interference effect of the film successively fluctuates, and thus the reflectivity R of the film for light is also successively changed. However, the changing of the reflectivity R is not considered in formula (1), which results in a difference between a measured temperature and an actual temperature of the film, and an inaccurate measurement result. Due to an oversimplification of formula (1), the result calculated from the formula (1) may be acceptable at a low temperature or a low measurement precision requirement, but at a high temperature and a high measurement precision requirement, this calculation method can not meet actual technological requirements. For example, in metal organic chemical vapor deposition (MOCVD), the temperature inside the reaction chamber is up to over 1000 Celsius degree and even up to 1200 Celsius degree. At the same time, a temperature difference in a space with a diameter larger than half meter is less than 1%, i.e., about 10 Celsius degree. In this condition, some factors influence the detecting accuracy of radiation value, for example, other minor factors in the reaction region, such as background radiation, loss in optical transmission etc., can results in a distortion of the detected temperature, which is unable to meet the requirements of industrial applications. Therefore, a high precise method for measuring a temperature at a high temperature ($\geq$300 Celsius degree) is needed.

SUMMARY

In view of this, a method for measuring a temperature of a film in a reaction chamber is provided, which may provide an accurate measuring result and meet the high precision of temperature measurement at high temperature.

To achieve the foregoing object, a method for measuring a temperature of a film in a reaction chamber is provided according to an embodiment of the application. The method includes:

obtaining reflectivity sampling data R of a sampling point set in a detection area of the film for light with a wavelength $\lambda$, and thermal radiation value sampling data E of the sampling point set, wherein the sampling point set includes at least two sampling points; the reflectivity sampling data R is a set of $R_{(i)}$, where i is a positive integer, the thermal radiation value sampling data E is a set of $E_{(i)}$, wherein $R_{(i)}$ is a reflectivity of the i-th sampling point for the light and $E_{(i)}$ is a thermal radiation value of the i-th sampling point, and $R_{(i)}$ and $E_{(i)}$ constitutes an i-th sampling data group;

obtaining a first correction factor $\alpha$ and a second correction factor $\gamma$ according to values of at least two sampling data groups, wherein $0<\alpha\leq1$, $0\leq\gamma\leq1$;

obtaining a blackbody radiation value $L_b$ of the detection area of the film for the light with the wavelength $\lambda$ according to the first correction factor $\alpha$, the second correction factor $\gamma$ and the values of at least two sampling data groups; and obtaining a temperature T of the detection area by looking up a table according to the blackbody radiation value $L_b$ and the wavelength $\lambda$.

Preferably, the obtaining a first correction factor $\alpha$ and a second correction factor $\gamma$ according to values of at least two sampling data groups includes:

obtaining a ratio $\gamma/\alpha$ of the second correction factor $\gamma$ to the first correction factor $\alpha$ according to the values of the at least two sampling data groups; and calculating the first correction factor $\alpha$ and the second correction factor $\gamma$ according to the ratio $\gamma/\alpha$, the values of the at least two sampling data groups, and a radiation equation $$E=[\alpha(1-R)+\gamma]\times L_b(\lambda,T).$$

Preferably, the obtaining a ratio $\gamma/\alpha$ of the second correction factor $\gamma$ to the first correction factor $\alpha$ according to the values of the at least two sampling data groups includes:

calculating variance of the blackbody radiation value $L_b$ according to the values of the at least two sampling data groups and the radiation equation $$E=[\alpha(1-R)+\gamma]\times L_b(\lambda,T); \text{ and}$$

calculating the ratio $\gamma/\alpha$ to minimize the variance of the blackbody radiation value $L_b$.

Preferably, a sampling time interval between two adjacent sampling points is less than 2 microseconds when the reflectance sampling data R is obtained; and a sampling time interval between two adjacent sampling points is less than 2 microseconds when the heat radiation value sampling data E is obtained.

Preferably, the temperature of the film is lower than 600 Celsius degree.

Preferably, the reaction chamber is an MOCVD reaction chamber.

A method for measuring a temperature of a film in a reaction chamber is provided according to another embodiment of the application. The method comprises:

obtaining first reflectivity sampling data $R_1$ of a first sampling point set in a detection area of the film for light with a wavelength $\lambda_1$ and first thermal radiation value sampling data $E_1$ of the first sampling point set, wherein the first sampling point set includes at least two sampling points; the first reflectivity sampling data $R_1$ is a set of $R_{1(i)}$ (i is a positive integer), the thermal radiation value sampling data $E_1$ is a set of $E_{1(i)}$, wherein $R_{1(i)}$ is a reflectivity of the i-th sampling point for the light with the wavelength $\lambda_1$ and $E_{1(i)}$ is a thermal radiation value of the i-th sampling point, and $R_{1(i)}$ and $E_{1(i)}$ constitutes an i-th first sampling data group;

obtaining second reflectivity sampling data $R_2$ of a second sampling point set in the detection area of the film for light with a wavelength $\lambda_2$ and second thermal radiation value sampling data $E_2$ of the second sampling point set, wherein the second sampling point set includes at least two sampling points; the second reflectivity sampling data $R_2$ is a set of $R_{2(j)}$ (j is a positive integer), the second thermal radiation value sampling data $E_2$ is a set of $E_{2(j)}$, wherein $R_{2(j)}$ is a reflectivity of the j-th sampling point for the light with the wavelength $\lambda_2$ and $E_{2(j)}$ is a thermal radiation value of the j-th sampling point, and $R_{2(j)}$ and $E_{2(j)}$ constitutes a j-th second sampling data group;

obtaining a first correction factor $\alpha$ and a second correction factor $\gamma$ according to at least two values in first sampling data groups and at least two values in second sampling data groups, wherein $0 < \alpha \leq 1$, $0 \leq \gamma \leq 1$;

obtaining a blackbody radiation value $L_{b1}$ of the detection area of the film for the light with the wavelength $\lambda_1$ according to the first correction factor $\alpha$, the second correction factor $\gamma$, and the at least two values in the first sampling data groups; and obtaining a temperature T of the detection area by looking up a table according to the blackbody radiation value $L_{b1}$ and the wavelength $\lambda_1$.

Preferably, the obtaining a first correction factor $\alpha$ and a second correction factor $\gamma$ according to at least two values in first sampling data groups and at least two values in second sampling data groups includes:

obtaining a ratio $\gamma/\alpha$ of the second correction factor $\gamma$ to the first correction factor $\alpha$ according to the at least two values in the first sampling data groups and the at least two values in the second sampling data groups;

calculating the first correction factor $\alpha$ and the second correction factor $\gamma$ according to the ratio $\gamma/\alpha$, the at least two values in the first sampling data groups, the at least two values in the second sampling data groups, and a radiation equation $$E = [\alpha(1-R) + \gamma] \times L_b(\lambda, T).$$

Preferably, the obtaining a ratio $\gamma/\alpha$ of the second correction factor $\gamma$ to the first correction factor $\alpha$ according to the at least two values in the first sampling data groups and the at least two values in the second sampling data groups includes:

calculating a variance of the blackbody radiation value $L_{b1}$ according to the at least two values in the first sampling data groups and the radiation equation $$E = [\alpha(1-R) + \gamma] \times L_b(\lambda, T),$$

and calculating a variance of $L_{b2}$ according to the at least two values of the second sampling data groups and the radiation equation $$E = [\alpha(1-R) + \gamma] \times L_b(\lambda, T);$$

calculating the ratio $\gamma/\alpha$ to minimize the variance of the $L_{b1}$ and the variance of the $L_{b2}$.

Preferably, a sampling time interval between two adjacent sampling points is less than 2 microseconds when the reflectance sampling data $R_1$ is obtained; a sampling time interval between two adjacent sampling points is less than 2 microseconds when the heat radiation value sampling data $E_1$ is obtained; a sampling time interval between two adjacent sampling points is less than 2 microseconds when the reflectance sampling data $R_2$ is obtained; and a sampling time interval between two adjacent sampling points is less than 2 microseconds when the heat radiation value sampling data $E_2$ is obtained.

Preferably, a difference between the wavelength $\lambda_1$ and the wavelength $\lambda_2$ ranges from 10 nm to 200 nm.

Preferably, the temperature of the film is higher than or equal to 600 Celsius degree.

Furthermore, a method for measuring a temperature of a film in a reaction chamber is provided according to another embodiment of the application. The method includes:

obtaining a reflectivity $R_{(i)}$ of the i-th sampling point in a detection area of the film for light with a wavelength $\lambda$, and a thermal radiation value $E_{(i)}$ (i is a positive integer) of the sampling point, and measuring multiple other sampling points in the detection area of the film to obtain reflectivity sampling data R of the other sampling points in the detection area of the film for the light with the wavelength $\lambda$, and thermal radiation values E of the other sampling points, wherein $R_{(i)}$ and $E_{(i)}$ constitutes the i-th sampling data group;

obtaining a first correction factor $\alpha$ and a second correction factor $\gamma$ according to values of at least two sampling data groups, wherein $0 < \alpha \leq 1$, $0 \leq \gamma \leq 1$;

obtaining a blackbody radiation value $L_b$ of the detection area of the film for the light with the wavelength $\lambda$ according to the first correction factor $\alpha$, the second correction factor $\gamma$ and the values of at least two sampling data groups; and obtaining a temperature T of the detection area by looking up a table according to the blackbody radiation value $L_b$ and the wavelength $\lambda$.

Preferably, the obtaining a first correction factor $\alpha$ and a second correction factor $\gamma$ according to values of at least two sampling data groups includes:

obtaining a ratio $\gamma/\alpha$ of the second correction factor $\gamma$ to the first correction factor $\alpha$ according to the values of the at least two sampling data groups; and calculating the first correction factor $\alpha$ and the second correction factor $\gamma$ according to the ratio $\gamma/\alpha$, the values of the at least two sampling data groups, and a radiation equation $$E_i = [\alpha(1-R_i) + \gamma] \times L_b(\lambda, T).$$

Preferably, the obtaining a ratio $\gamma/\alpha$ of the second correction factor $\gamma$ to the first correction factor $\alpha$ according to the values of the at least two sampling data groups includes:

calculating a variance of the blackbody radiation value $L_b$ according to the values of the at least two sampling data groups and a radiation equation $$E = [\alpha(1-R) + \gamma] \times L_b(\lambda, T); \text{ and}$$

selecting a value of the ratio $\gamma/\alpha$ to obtain a same blackbody radiation value $L_b$ in different sampling data groups.

According to the embodiments of the application, in the process of measuring a temperature of a film in a reaction chamber, various parameters, such as reflectivity, thermal radiation value, optical system efficiency, blackbody radiation value, etc., are synthetically considered. The first correction factor and the second correction factor are added. The variation of various parameters during film growth are corrected by the first correction factor and the second correction factor to obtain an accurately corrected thermal radiation value, and finally an accurately measured temperature of the film can be obtained. Comparing to the existing technology, the measured temperatures of films obtained with the method for measuring the temperature of the film in the reaction chamber according to the embodiments are closer to the actual temperature of film, i.e., the measuring result is more accurate.

BRIEF DESCRIPTION OF THE DRAWINGS

To better explain the technical solutions in the embodiments or in existing technologies, drawings for description of the embodiments or for existing technologies are briefly described as following. Apparently, the drawings in following description are some embodiments of the application. A person having ordinary skill in the art can obtain other drawings according to these drawings under the premise of paying no creative work.

DETAILED DESCRIPTION OF THE EMBODIMENTS

The objects, technical solutions and advantages in the embodiments are clearly and completely described below combining with drawings of the embodiments. Apparently, the embodiments described are not all of, instead only a part of all embodiments. Based on the embodiments of the application, all the other embodiments obtained by a person having ordinary skill in the art under the premise of paying no creative work are within the protection scope of the application.

The technical solution of the application is applicable to a MOCVD reaction chamber, or other CVD reaction chambers or ovens required to measure the temperature with a high precision at a high temperature (≥300 Celsius degree). In the following embodiments, the solution may be explained by taking MOCVD equipment as an example.

Figure 1:
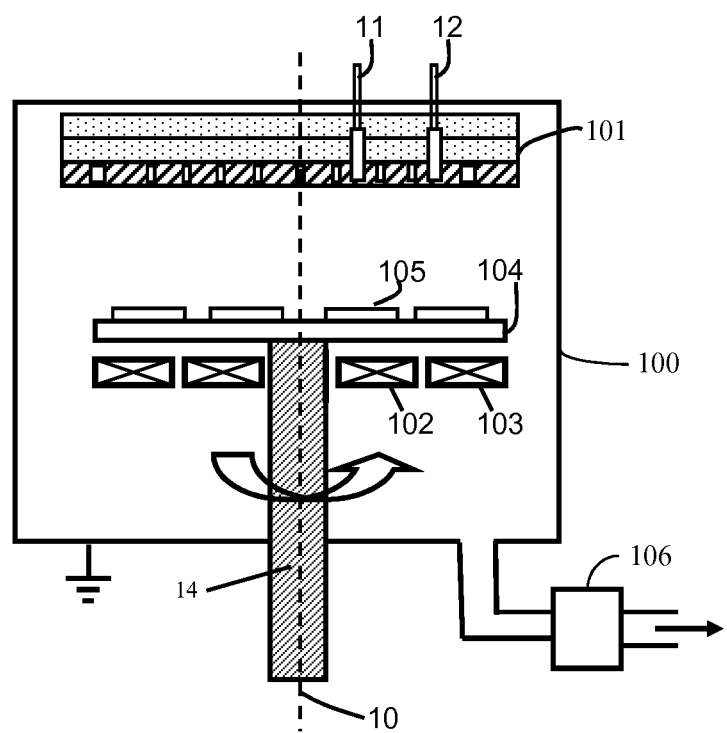
FIG. 1 is a structural diagram of an MOCVD reaction chamber to which a technical solution of an embodiment is applicable.

FIG. 1 is a structural diagram of an MOCVD reactor to which the application is applicable. The reactor in FIG. 1 has a reaction chamber 100. A tray 104 supported by a rotation shaft 14 is provided inside the reaction chamber 100. Multiple substrates 105 are placed on the tray 104. Multiple heating devices 102 and 103 are provided below the tray 104. A gas distribution device 101 is provided at an upper side, facing the tray 104, of the reaction chamber 100. Two optical observation system elements 11 and 12 are provided in the gas distribution device 101. A gas pumping device 106 is configured to pump out gas after reaction and maintain a gas pressure in the reaction chamber 100 at a desired level. The rotation shaft 14 drives the tray 104 to rotate at a high speed around an axis 10. A rotational speed of the rotation shaft may be up to 300 rounds per minute or even more than 1000 rounds per minute.

Embodiment 1

Figure 2:
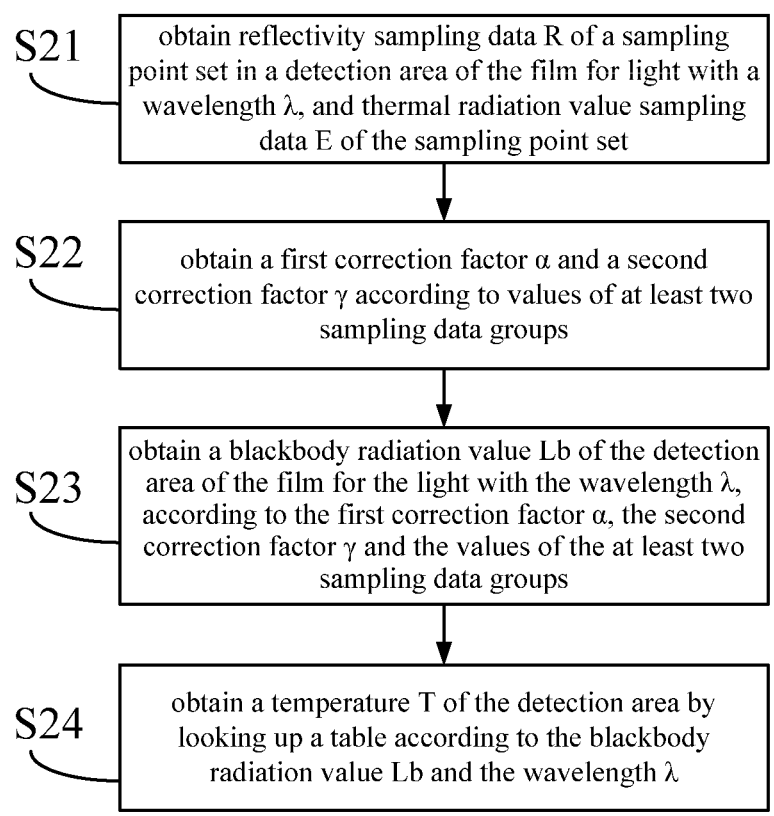
FIG. 2 is a flow chart of a method for measuring a temperature of a film in a reaction chamber according to a first embodiment of the application.

A method of measuring a temperature of a film in a reaction chamber according to a first embodiment is illustrated in FIG. 2. In the operation of the method, it is required to irradiate the film by light with a certain wavelength. The method includes steps S21-S24.

Step S21 may include: obtaining reflectivity sampling data R of a sampling point set in a detection area of the film for light with a wavelength λ, and thermal radiation value sampling data E of the sampling point set.

The sampling point set includes at least two sampling points. The reflectivity sampling data R is a set of $R_{(i)}$ (i is a positive integer), and the thermal radiation value sampling data E is a set of $E_{(i)}$, where $R_{(i)}$ is a reflectivity of the i-th sampling point for the light and $E_{(i)}$ is a thermal radiation value of the i-th sampling point, and $R_{(i)}$ and $E_{(i)}$ constitutes the i-th sampling data group.

In the embodiment of the application, the reflectivity sampling data of the sampling point set may be obtained first, and the thermal radiation value sampling data of the sampling point set may be obtained later. Alternatively, the thermal radiation value sampling data of the sampling point set may be obtained first, and the reflectivity sampling data of the sampling point set may be obtained later. Alternatively, both the reflectivity sampling data and the thermal radiation value sampling data of the sampling point set may be obtained at the same time, i.e., the reflectivity sampling data and the thermal radiation value sampling data can be sampled almost synchronously. For example, both the reflectivity sampling data and the thermal radiation value sampling data may be sampled at the same time; or a time interval, when a sampling point for sampling the reflectivity sampling data and a sampling point for sampling the thermal radiation value sampling data are sampled, is small enough (less than 0.1 ms), to ensure that the sampling points thereof are actually in the same temperature detection area and have comparability.

In the embodiments, the reflectivity sampling data R of a sampling point in a temperature detection area of the film for the light with the wavelength λ can be detected directly by a device for detecting a reflectivity. The thermal radiation value sampling data E of the sampling point set can be detected with a dedicated device for detecting a thermal radiation value. A beam of known reference light incidences to surface of the detection area through the optical observation system element 11 in FIG. 1, and the reflected reference light is received at another angle, for example by an optical observation system element 12. Due to effects of factors such as the surface flatness of the detection area and reflected light energy lossing in optical system, an optical system efficiency value P is needed to compensate for this error. An accurate value of the optical system efficiency value P may be obtained by testing in the operation process of metal organic chemical vapor deposition (MOCVD) reactor. Therefore, the optical system efficiency value P can be obtained in lab, where the optical system efficiency value P is in a range from 0 to 1. In a subsequent application, the influence of these factors applied to the monitoring system may be compensated by the optical system efficiency value P.

The reflectivity sampling data R of a sampling point in the temperature detection area of the film for light with the wavelength λ can be measured in other ways, besides the method for detecting the reflectivity sampling data by a device for detecting the reflectivity. For example, assuming a thermal equilibrium state achieved inside the reaction chamber, in the thermal equilibrium state, according to the law of conservation of energy:

$$R+\tau+\delta 1 \quad (2)$$

where in formula (2), R is reflectivity of the film for light, $\tau$ is transmittance of the film for light, and $\delta$ is absorptivity of the film for light.

In most cases, the film has a uniform growth rate. Assuming the film is opaque and has a planar surface, then:

$$R+\delta=1 \quad (3)$$

i.e., $R=1-\delta$ (4)

Therefore, the absorptivity $\delta$ of the film for light may be obtained by the measurement, and the reflectivity R of the film for light may be obtained by calculation.

It is noted that in the growth process of the film, the reflectivity of the film for the light with a certain wavelength $\lambda$ changes continuously with the continuous change in the thickness of the film. Therefore, the reflectivity of the film for the light with the certain wavelength $\lambda$ should be measured many times to obtain an accurately measured temperature of the film. The reflectivity obtained by measuring many times, the detected reflectivity values obtained in each measuring time is $R_{(i)}$, where i is a positive integer.

In the embodiment of the application, when the reflectivity sampling data R of the sampling point set in the detection area of the film for the light with the wavelength $\lambda$ and the thermal radiation value sampling data E of the sampling point set are obtained, the film may be in a static state, and thus a sampling point is measured many times to obtain multiple reflectivity $R_{(i)}$.

In addition, when the reflectivity sampling data R of the sampling point set in the detection area of the film for the light with the wavelength $\lambda$ and the thermal radiation value sampling data E of the sampling point set are obtained, the film may also be in a moving state. The moving state may be forward movement along a straight line, or rotation around an axis. In an implementation of the application, for example, in an MOCVD reaction chamber, the film may be on the substrates 105 in FIG. 1 and rotates at high speed around the axis 10. In this case, the detection area of the film also rotates at high speed around the axis 10. Therefore, after the reflectivity and/or thermal radiation value of a current sampling point is obtained, the reflectivity and/or thermal radiation value of a next sampling point actually stand for the values of a sampling point with a small horizontal movement from the current sampling point.

In the embodiment of the application, when the film is in a moving state, the time interval between two sampling actions may be small enough, to ensure that the reflectivity obtained at several adjacent sampling points are coherent, and thus avoid a dramatic change of the measuring position or the thickness of the film etc. between two adjacent sampling actions, which may be caused by the changing of the position or temperature drift within the time interval. For example, the time interval when two adjacent sampling points are sampled is less than 2 microseconds, in the case that the reflectivity sampling data R is obtained, and a time interval when two adjacent sampling points are sampled is less than 2 microseconds, in the case that the thermal radiation value sampling data E is obtained. For example, the i-th sampling point is sampled to obtain the reflectivity $R_{(i)}$ at moment t1, the i+1-th sampling point is sampled to obtain the reflectivity $R_{(i+1)}$ at moment t2, and then the time interval between t2 and t1 is less than 2 microseconds. The i-th sampling point is sampled to obtain the thermal radiation value $E_{(i)}$ at moment T1, the i+1-th sampling point is sampled to obtain the thermal radiation value $E_{(i+1)}$ at moment T2, and then the time interval between T2 and T1 is less than 2 microseconds. Sampling times per second is defined as a sample obtaining frequency. Thus, in the embodiment of the application, the sample obtaining frequencies for obtaining reflectivity sampling data R and obtaining thermal radiation value E may both be larger than 50K (or even larger than 100K or 200K).

In a film growth process, when the thickness of the film changes continuously, the thermal radiation value of the film under the radiation of the light with wavelength $\lambda$ will changes accordingly. Therefore, during the measurement, if the reflectivity needs to be measured many times, the thermal radiation value needs to be measured many times accordingly.

Step S22 includes: obtaining a first correction factor $\alpha$ and a second correction factor $\gamma$ according to values of at least two sampling data groups, where $0<\alpha\leq1$, $0\leq\gamma\leq1$;

In this step, the first correction factor $\alpha$ and the second correction factor $\gamma$ can be obtained by empirical reasoning, or can be obtained according to the results obtained in the foregoing step S21. In particular, step S22 can be performed by the following manner (including step A and step B).

Step A includes: obtaining a ratio $\gamma/\alpha$ of the second correction factor $\gamma$ to the first correction factor $\alpha$ according to the values in at least two sampling data groups.

Step B includes: calculating the first correction factor $\alpha$ and the second correction factor $\gamma$ according to the ratio $\gamma/\alpha$, the values in at least two sampling data groups, and a radiation equation $$E=[\alpha(1-R)+\gamma]\times L_b(\lambda,T).$$

It is noted that considering the optical system efficiency P, the radiation equation can be transformed as $E=P[\alpha(1-R)+\gamma]\times L_b(\lambda, T)$, where $0<P\leq1$.

Thus, the step A can be carried out in the following way.

A variance of the $L_b$ is calculated according to the values in at least two sampling data groups and the radiation equation $$E=[\alpha(1-R)+\gamma]\times L_b(\lambda,T).$$

The radiation equation $$E=[\alpha(1-R)+\gamma]\times L_b(\lambda,T)$$

can be transformed into $$E=P[\alpha(1-R)+\gamma]\times L_b(\lambda,T),$$

where $0<P\leq1$.

Then, the ratio $\gamma/\alpha$ is calculated to minimize the variance of the $L_b$.

Step S23 includes: obtaining a blackbody radiation value $L_b$ of the detection area of the film for the light with the wavelength $\lambda$, according to the first correction factor $\alpha$, the second correction factor $\gamma$ and the values in at least two sampling data groups.

In an embodiment, the blackbody radiation value $L_b$ can be obtained according to the following formula:

$$E=P[\alpha(1-R)+\gamma]\times L_b(\lambda,T) \quad (5)$$

where $L_b$ is a function of wavelength $\lambda$ and temperature T to be measured.

Substituting multiple sampling values R(i) and E(i) from reflectivity sampling data R and thermal radiation sampling data E in at least two sampling data groups, the optical system efficiency P, the first correction factor $\alpha$ and the second correction factor $\gamma$, all of which are obtained in foregoing steps S21-S23, into formula (5), the blackbody radiation value $L_b$ of the detection area of the film for the light with the wavelength $\lambda$ can be calculated.

Step S24 includes: obtaining a temperature T of the detection area by looking up a table according to the blackbody radiation value $L_b$ and the wavelength $\lambda$.

During the measurement of the temperature of the film in a reaction chamber with this method, various parameters, such as reflectivity, thermal radiation value, optical system efficiency, blackbody radiation value, etc., are synthetically considered. The first correction factor and the second correction factor are added. The variation of various parameters during film growth are corrected by the first correction factor and the second correction factor to obtain an accurately corrected thermal radiation value, and finally an accurately measured temperature of film can be obtained. Comparing to the existing technology, the measured temperature of film obtained by the invented method according to the embodiment is closer to the actual temperature of film, i.e., the measuring result is more accurate. Comparing to the existing technology, the temperature may be measured more accurately by adopting more sampling data groups for one wavelength.

It is noted that forgoing embodiment 1 is merely explained by taking a MOCVD reaction chamber as an example. In addition, the embodiment 1 can also be applied to other types of reaction chambers, which will not be illustrated herein.

As mentioned above, when the temperature of the film is lower than 600 Celsius degree, light with a single wavelength may radiate the film to obtain accurately the measured temperature of the detection area of the film. It is noted that when the temperature of film is equal to or higher than 600 Celsius degree, make the light with two or more wavelengths radiate the film to obtain accurate measured temperature in the detection area of the film. The following solutions will be described by taking the radiation of light with two wavelengths as an example.

Embodiment 2

Figure 3:
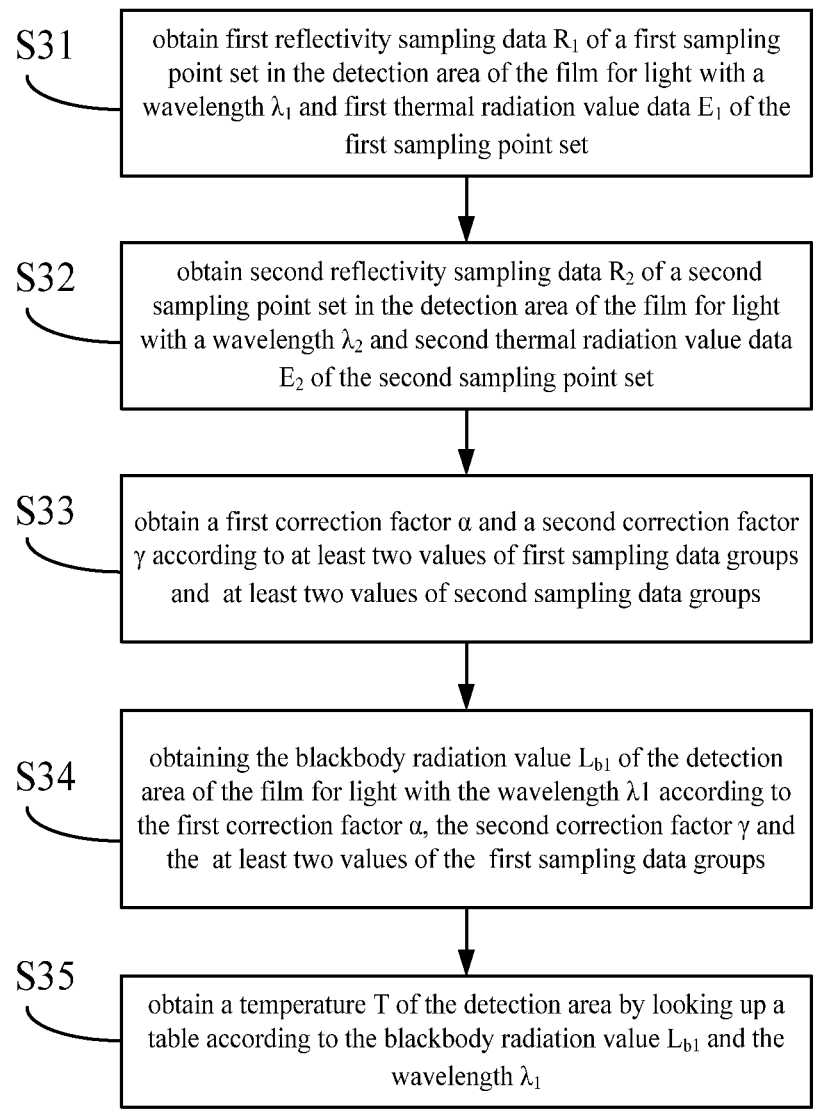
FIG. 3 is a flow chart of a method for measuring a temperature of a film in a reaction chamber according to a second embodiment of the application.

A method for measuring the film temperature inside a reaction chamber is provided according to a second embodiment of the application. The method is applicable to the measurement of the temperature of the detection area of the film, in the case that the temperature of the film is higher than or equal to 600 Celsius degree. An area on the film to be measured is selected as a detection area. Two sampling point sets are selected in the detection area. Each sampling point set includes at least two sampling points. Sampling points in these two sampling point sets can be different, or partly overlapped. FIG. 3 shows a flow chart of this method. The method includes steps S31-S35.

Step S31 includes: obtaining first reflectivity sampling data $R_1$ from first sampling point set in the detection area of the film for light with a wavelength $\lambda_1$ and first thermal radiation value data $E_1$ from first sampling point set, where the first sampling point set includes at least two sampling points; the first reflectivity sampling data $R_1$ is a set of $R_{1(i)}$ (i is a positive integer), the first thermal radiation value sampling data $E_1$ is a set of $F_{1(i)}$, where $R_{1(i)}$ is a reflectivity of the i-th sampling point for the light with the wavelength $\lambda_1$ and $E_{1(i)}$ is a thermal radiation value of the i-th sampling point, and $R_{1(i)}$ and $E_{1(i)}$ constitutes an i-th first sampling data group.

This step is similar to the step S21 in the foregoing first embodiment, which will be omitted herein.

Step S32 includes: obtaining second reflectivity sampling data $R_2$ from second sampling point set in the detection area of the film for light with a wavelength $\lambda_2$ and second thermal radiation value data $E_2$ from second sampling point set, where the second sampling point set includes at least two sampling points; the second reflectivity sampling data $R_2$ is a set of $R_{2(j)}$ (j is a positive integer), the second thermal radiation value sampling data $E_2$ is a set of $E_{2(j)}$, where $R_{2(j)}$ is a reflectivity of a j-th sampling point for the light with the wavelength $\lambda_2$ and $E_{2(j)}$ is a thermal radiation value of the j-th sampling point, $R_{2(j)}$ and $E_{2(j)}$ constitutes a j-th second sampling data group 2.

This step is similar to the step S21 in the foregoing first embodiment, which will be omitted herein.

It is noted that in the embodiment of the application, when the film is in a moving state, the time interval between two sampling actions should be small enough, to ensure that the detected reflectivity values at several adjacent sampling points is coherent, so as to avoid the measuring position or the thickness of the film change vastly between two sampling actions, which may be caused by the changing of the position or temperature drift with time. For example, in the step for obtaining first/second reflectivity sampling data $R_1/R_2$, a sampling time interval between two adjacent sampling points should be less than 2 microseconds; in the step for obtaining first/second thermal radiation value sampling data $E_1/E_2$, a sampling time interval between two adjacent sampling points should be less than 2 microseconds. Sampling times per unit time (second) is defined as a sample obtaining frequency. Thus, in the embodiment of the application, the sample obtaining frequencies for obtaining the reflectivity sampling data and obtaining the thermal radiation value data may both be larger than 50 K (or even larger than 100 K or 200 K).

The order of step S31 and step S32 can be reversed, i.e., the step S32 is executed first and then the step S31 is executed, which will not be limited herein.

The final temperature T of the detection area of the film is obtained by cooperating the first sampling data group and the second sampling data group, where the first sampling data group includes: a reflectivity and a thermal radiation value obtained under the radiation of light with the wavelength $\lambda_1$; and the second sampling data group includes: a reflectivity and a thermal radiation value obtained under the radiation of light with the wavelength $\lambda_2$.

Step S33 includes: obtaining a first correction factor $\alpha$ and a second correction factor $\gamma$ according to at least two values in first sampling data groups and at least two values in second sampling data groups, where $0<\alpha\leq1$, $0\leq\gamma\leq1$.

The step S33 can be performed in a following manner (including step A and step B).

Step A includes: obtaining a ratio $\gamma/\alpha$ of the second correction factor $\gamma$ to the first correction factor $\alpha$ according to at least two values in first sampling data groups and at least two values in second sampling data groups.

Step B includes: calculating the first correction factor $\alpha$ and the second correction factor $\gamma$ according to the ratio $\gamma/\alpha$, at least two values in first sampling data groups, at least two values in second sampling data groups, and a radiation equation $$E=[\alpha(1-R)+\gamma]\times L_b(\lambda,T)$$

Considering an optical system efficiency P, the radiation equation can be transformed as $$E=[\alpha(1-R)+\gamma]\times L_b(\lambda,T),$$

where $0<P\leq1$.

Particularly, the step A can be carried out in the following way.

A variance of $L_{b1}$ and a variance of $L_{b2}$ are firstly calculated according to at least two values in first sampling data groups, at least two values in second sampling data groups and the radiation equation $$E=[\alpha(1-R)+\gamma]\times L_b(\lambda,T).$$

Then, the ratio $\gamma/\alpha$ is calculated to minimize the variance of $L_{b1}$ and the variance of $L_{b2}$.

Step S34 includes: obtaining the blackbody radiation value $L_{b1}$ of the detection area of the film for light with the wavelength $\lambda_1$ according to the first correction factor $\alpha$, the second correction factor $\gamma$ and at least two values in first sampling data groups.

This step is similar to the step S23 in the foregoing first embodiment, which will be omitted herein.

Step S35 includes: obtaining a temperature T of the detection area by looking up a table according to the blackbody radiation value $L_{b1}$ and the wavelength $\lambda_1$.

The error caused by the detection with a single wavelength can be reduced by measuring the temperature with sampling data groups for light with two different wavelengths. Similarly, sampling data groups for light with more wavelengths, for example a third wavelength, can also be applied in the application.

It is noted that in the embodiment of the application, the first correction factor $\alpha$ and the second correction factor $\gamma$ may be obtained in the step S33 by the following way. Due to a high sampling frequency in the application, all sampling points are very close to each other, and the sampling time of each sampling data group of $R_{1(i)}$ and $E_{1(i)}$ is almost synchronous. Thus, the tray is rotated within a short distance in the sampling times of several adjacent sampling data groups. In this way, it is considered that the sampled positions corresponding to these several sampling data groups have the same temperature, i.e., several sampling points are located in the detection areas with the same temperature. From formula $$E=[\alpha(1-R)+\gamma]\times L_b(\lambda,T),$$

the blackbody radiation $L_b$ depends on a wavelength $\lambda$ and a temperature T. With a same wavelength $\lambda$ and a same temperature T, the several adjacent sampling points definitely have the same blackbody radiation $L_b$. If the optical system efficiency P is known, $L_{b1}$ is obtained by deriving $$E=P[\alpha(1-R)+\gamma]\times L_{b1},$$

which is a function $L_{b1}(\alpha, \gamma, R_1, E_1)$ with variables of $\alpha$, $\gamma$, $R_1$, $E_1$. Because the several adjacent sampling points have the same $L_{b1}$, a variance of the above $L_{b1}(\alpha, \gamma, R_1, E_1)$ must be equal to zero. The function for calculating the variance of $L_{b1}(\alpha, \gamma, R_1, E_1)$ is $V(\alpha, \gamma, R_1, E_1)$. Multiple sampling data groups of $R_{1(i)}$ and $F_{1(i)}$ are substituted into the function for calculating the variance to obtain a function with only unknown variables $\alpha$ and $\gamma$. Since $V(\alpha, \gamma, R_1, E_1)$ actually is equal to zero, a relation between $\gamma$ to $\alpha$ can be obtained to make $V(\alpha, \gamma, R_1, E_1)$ as close to zero as possible. For example, the ratio of $\gamma$ to $\alpha$ can be obtained according to the equation below:

$$\frac{\gamma}{\alpha} = \frac{-\sum \frac{1-R_i}{E_i} - \hat{R}\left(\frac{1}{E_i} - \hat{E}\right)}{\sum \left(\frac{1}{E_i} - \hat{E}\right)^2} \quad (6)$$

$$\hat{R} = \frac{1}{N}\sum \frac{1-R_i}{E_i}$$

$$\text{where, } \hat{E} = \frac{1}{N}\sum \frac{1}{E_i} \quad (7)$$

From foregoing formulas (6) and (7), the more the sampling data groups are, the more accurate the ratio of $\gamma$ to $\alpha$ is. However, too many sampling data groups are not expected. Too many sampling data groups will not only increase the computational burden, but also result in a far distance between the first sampling point and the last sampling point, which cause the deviation of actual temperature and destroy the base in which different points have a same blackbody radiation.

The ratio of $\gamma$ to $\alpha$ can also be obtained by other methods. For example, the ratio of $\gamma$ to $\alpha$ can also be obtained by simultaneous equation $$L_b[\alpha,\gamma,R_{1(1)},E_{1(1)}]=L_b[\alpha,\gamma,R_{1(2)},E_{1(2)}]$$

according to two sampling data groups:

$$\frac{\gamma}{\alpha} = \frac{E_{12)}(1-R_{11)}) - E_{11)}(1-R_{12)})}{E_{11)} - E_{12)}}. \quad (8)$$

Because the sampling points of formula (8) are fewer than those of formula (6), the precision of obtained correction factors is different. Algorithms can be chosen according to the needs of various applications.

The unknown variables $R_1$ and $E_1$ is obtained by sampling, the relation between $\alpha$ and $\gamma$ is already known, the values of $\alpha$, $\gamma$ and $L_b$ may be obtained by substituting multiple sampling data groups into simultaneous equation (5). Due to the corrections factors $\alpha$ and $\gamma$ introduced in the application, better precision of measured temperature can be obtained to meet the requirement of high precision of measured temperature in the application. The first correction factor $\alpha$ indicates a light transmission loss in the reaction chamber, and the second correction factor $\gamma$ indicates a background radiation of the reaction chamber.

Further, to obtain accurate correction factor $\alpha$ and correction factor $\gamma$, in the embodiment, one or more of the following conditions may be satisfied.

A. The difference between the wavelength $\lambda_1$ and the wavelength $\lambda_2$ ranges from 10 nm to 200 nm, for example 10 nm, 50 nm, 110 nm, 200 nm etc., to ensure the measured temperature of the film as accurate as possible.

In an implementation of the application, the wavelength $\lambda_2$ may be 940 nm and the wavelength $\lambda_1$ may be 1050 nm.

There are many algorithms after the sampling data groups are obtained. In the application, the relation between the first correction factor $\alpha$ and the second correction factor $\gamma$ is calculated first, and then multiple sampling data groups is substituted into the relation to obtain the values of $\alpha$, $\gamma$ and the final temperature. With the measurement method in the application, a high precision of measured temperature can be obtained. In addition, the method has high adaptability, and may be applied to various types of reaction chambers. When a traditional technology is applied to different reaction chambers, a test needs to be performed on each reaction chamber to obtain and record the optical system efficiency thereof. Then, during a formal running, the optical system efficiency is obtained from look-up table. The optical system efficiency needs to be corrected again, because the conditions inside the reaction chamber will drift after a period of running. In the application, the optical system efficiency can be obtained directly by simply calculating multiple sampling data groups, and can automatically adapt to different conditions in the reaction chamber to obtain an optimum value of optical system efficiency in a long run.

The first correction factor α and the second correction factor γ are introduced to formula (5) in the application. In addition, other two correction factors, besides α and γ, may be introduced to formula (5), which have different physical definitions and mathematical relation from α and γ in formula (5). In the method in the application, the temperature can be calculated precisely under the two basic conditions that multiple sampling data groups are obtained and that multiple adjacent sampling points have the same temperature.

Embodiment 3

Figure 4:
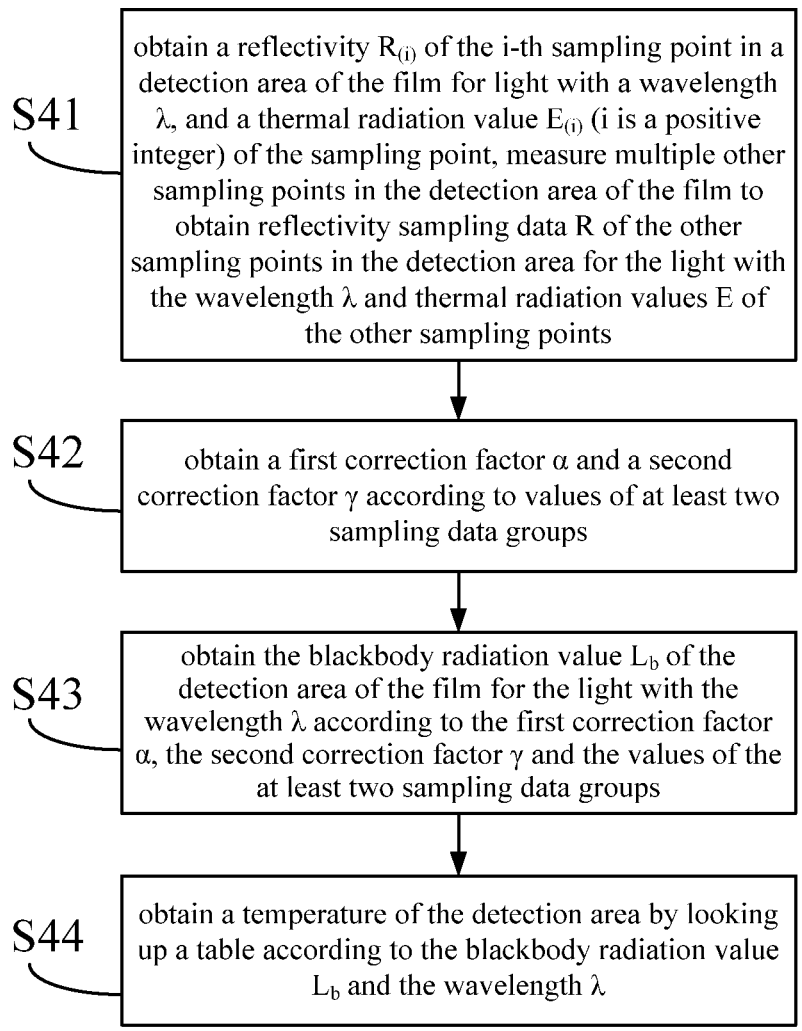
FIG. 4 is a flow chart of a method for measuring a temperature of a film in a reaction chamber according to a third embodiment of the application.

A method for measuring a temperature of a film in a reaction chamber is provided according to a third embodiment of the application. FIG. 4 is a flow chart of the method. The method includes step S41-S44.

Step S41 includes: obtaining a reflectivity $R_{(i)}$ of the i-th sampling point in a detection area of the film for light with a wavelength λ, and a thermal radiation value $E_{(i)}$ (i is a positive integer) of the sampling point, measuring multiple other sampling points in the detection area of the film to obtain reflectivity sampling data R of the other sampling points in the detection area for the light with the wavelength λ and thermal radiation values E of the other sampling points, where $R_{(i)}$ and $E_{(i)}$ constitute an i-th sampling data group.

It is noted that in the embodiment of the application, when the film is in a moving state, the time interval between two sampling must be small enough, to ensure that the reflectivity obtained at several adjacent sampling points is coherent, and thus avoid the measuring position or the thickness of the film changing vastly between two adjacent samplings, which may be caused by the position changing or temperature drift with time. A time interval between two sampling can be small enough. For example, in the step of obtaining the reflectivity sampling data R or thermal radiation value sampling data E, a sampling time interval between two adjacent sampling points should be less than 2 microseconds. Sampling times per unit time (second) is defined as a sample obtaining frequency. Thus, in the embodiment of the application, the sample obtaining frequencies for obtaining reflectivity sampling data R and obtaining thermal radiation value E may both be larger than 50 K (or even larger than 100 K or 200 K).

Step S42 includes: obtaining a first correction factor α and a second correction factor γ according to values of at least two sampling data groups, where 0<α≤1, 0≤γ≤1.

This step can be performed as following (including step A and step B).

Step A includes: obtaining a ratio γ/α of the second correction factor γ to the first correction factor α according to the values of the at least two sampling data groups.

Step B includes: calculating the first correction factor α and the second correction factor γ according to the ratio γ/α, the values of the at least two sampling data groups, and a radiation equation $$E_i=[\alpha(1-R_i)+\gamma]\times L_b(\lambda,T).$$

The step A may be performed in the following way.

A variance of $L_b$ is firstly calculated according to the values of the at least two sampling data groups and the radiation equation $$E_i=[\alpha(1-R_i)+\gamma]\times L_b(\lambda,T).$$

Then, the ratio γ/α is selected to obtain a same $L_b$ in different sampling data groups.

Step S43 includes: obtaining the blackbody radiation value $L_b$ of the detection area of the film for the light with the wavelength λ according to the first correction factor α, the second correction factor γ and the values of the at least two sampling data groups.

Step S44 includes: obtaining a temperature of the detection area by looking up a table according to the blackbody radiation value $L_b$ and the wavelength λ.

The description above is merely the preferred embodiments of the application. It should be noted that for person having ordinary skills in the art, some improvements and modifications can be performed under the premise of not departing from the principles of the application, and these improvements and modifications are also within the protection scope of the application.

The invention claimed is:

1. A method for controlling a temperature in a reaction chamber, comprising:

controlling a plurality of heating devices in the reaction chamber to operate according to a preset temperature, wherein the plurality of heating devices correspond to a plurality of detection areas of a film;

obtaining reflectivity sampling data R of a sampling point set in each of the plurality of detection areas of the film for light with a wavelength λ, and thermal radiation value sampling data E of the sampling point set, wherein the sampling point set comprises at least two sampling points; the reflectivity sampling data R is a set of $R_{(i)}$, wherein i is a positive integer; the thermal radiation value sampling data E is a set of $E_{(i)}$; wherein $R_{(i)}$ is a reflectivity of the i-th sampling point for the light and $E_{(i)}$ is a thermal radiation value of the i-th sampling point, and $R_{(i)}$ and $E_{(i)}$ constitutes the i-th sampling data group;

obtaining a first correction factor α and a second correction factor γ, for each of the plurality of detection areas, according to values of at least two sampling data groups, wherein 0<α≤1, 0≤γ≤1;

obtaining a blackbody radiation value $L_b$ of each of the plurality of detection areas of the film for light with the wavelength λ according to the first correction factor α, the second correction factor γ and the values of the at least two sampling data groups;

obtaining a temperature T of each of the plurality of detection areas by looking up a table according to the blackbody radiation value $L_b$ and the wavelength λ; and comparing the temperatures of the plurality of detection areas, and if an abnormal temperature exists in the temperatures of the plurality of detection areas, regulating a heating device corresponding to a detection region corresponding to the abnormal temperature;

wherein the obtaining a first correction factor α and a second correction factor γ, for each of the plurality of detection areas, according to values of at least two sampling data groups comprises:

obtaining a ratio γ/α of the second correction factor γ to the first correction factor α according to the values of the at least two sampling data groups; and calculating the first correction factor α and the second correction factor γ according to the ratio γ/α, the values of the at least two sampling data groups, and a radiation equation $$E=[\alpha(1-R)+\gamma]\times L_b(\lambda,T).$$

2. The method according to claim 1, wherein the obtaining a ratio $\gamma/\alpha$ of the second correction factor $\gamma$ to the first correction factor $\alpha$ according to the values of the at least two sampling data groups comprises:

calculating variance of the blackbody radiation value $L_b$ according to the values of the at least two sampling data groups and the radiation equation $$E=[\alpha(1-R)+\gamma]\times L_b(\lambda,T); \text{ and}$$

calculating the ratio $\gamma/\alpha$ to minimize the variance of the blackbody radiation value $L_b$.

3. The method according to claim 1, wherein a sampling time interval between two adjacent sampling points is less than 2 microseconds when the reflectivity sampling data R is obtained; and a sampling time interval between two adjacent sampling points is less than 2 microseconds when thermal radiation value sampling data E is obtained.

4. The method according to claim 1, wherein the temperature of the film is lower than 600 Celsius degree.

5. The method according to claim 1, wherein the reaction chamber is a metal organic chemical vapor deposition (MOCVD) reaction chamber.

6. A method for controlling a temperature in a reaction chamber, comprising:

controlling a plurality of heating devices in the reaction chamber to operate according to a preset temperature, wherein the plurality of heating devices correspond to a plurality of detection areas of a film;

obtaining first reflectivity sampling data $R_1$ of a first sampling point set in each of the plurality of detection areas of the film for light with a wavelength $\lambda_1$ and first thermal radiation value data $E_1$ of the first sampling point set, wherein the first sampling point set comprises at least two sampling points; the first reflectivity sampling data $R_1$ is a set of $R_{1(i)}$, wherein i is a positive integer; the first thermal radiation value sampling data $E_1$ is a set of $E_{1(i)}$, wherein $R_{1(i)}$ is a reflectivity of the i-th sampling point for the light with the wavelength $\lambda_1$ and $E_{1(i)}$ is a thermal radiation value of the i-th sampling point, and $R_{1(i)}$ and $E_{1(i)}$ constitutes an i-th first sampling data group;

obtaining second reflectivity sampling data $R_2$ of a second sampling point set in each of the plurality of detection areas of the film for light with a wavelength $\lambda_2$ and second thermal radiation value sampling data $E_2$ of the second sampling point set, wherein the second sampling point set comprises at least two sampling points; the second reflectivity sampling data $R_2$ is a set of $R_{2(j)}$, wherein j is a positive integer; the second thermal radiation value sampling data $E_2$ is a set of $E_{2(j)}$, wherein $R_{2(j)}$ is a reflectivity of the j-th sampling point for the light with the wavelength $\lambda_2$ and $E_{2(j)}$ is a thermal radiation value of the j-th sampling point, and $R_{2(j)}$ and $E_{2(j)}$ constitutes a j-th second sampling data group;

obtaining a first correction factor $\alpha$ and a second correction factor $\gamma$, for each of the plurality of detection areas, according to at least two values in first sampling data groups and at least two values in second sampling data groups, wherein $0<\alpha\leq 1$, $0\leq\gamma\leq 1$;

obtaining a blackbody radiation value $L_{b1}$ of each of the plurality of detection areas of the film for the light with the wavelength $\lambda_1$ according to the first correction factor $\alpha$, the second correction factor $\gamma$ and the at least two values in the first sampling data groups;

obtaining a temperature T of each of the plurality of detection areas by looking up a table according to the blackbody radiation value $L_{b1}$ and the wavelength $\lambda_1$; and comparing the temperatures of the plurality of detection areas, and if an abnormal temperature exists in the temperatures of the plurality of detection areas, regulating a heating device corresponding to a detection region corresponding to the abnormal temperature;

wherein the obtaining a first correction factor $\alpha$ and a second correction factor $\gamma$, for each of the plurality of detection areas, according to at least two values in first sampling data groups and at least two values in second sampling data groups comprises:

obtaining a ratio $\gamma/\alpha$ of the second correction factor $\gamma$ to the first correction factor $\alpha$ according to at least two values in first sampling data groups and at least two values in second sampling data groups; and calculating the first correction factor $\alpha$ and the second correction factor $\gamma$ according to the ratio $\gamma/\alpha$, the at least two values in first sampling data groups, the at least two values in second sampling data groups, and a radiation equation $$E=[\alpha(1-R)+\gamma]\times L_b(\lambda,T).$$

7. The method according to claim 6, wherein the obtaining a ratio $\gamma/\alpha$ of the second correction factor $\gamma$ to the first correction factor $\alpha$ according to at least two values in first sampling data groups and at least two values in second sampling data groups comprises:

calculating a variance of the blackbody radiation value $L_{b1}$ according to the at least two values in the first sampling data groups and a radiation equation $$E=[\alpha(1-R)+\gamma]\times L_b(\lambda,T),$$

and calculating a variance of a blackbody radiation value $L_{b2}$ of the detection area of the film for the light with the wavelength $\lambda_2$ according to the at least two values in the second sampling data groups and the radiation equation $$E=[\alpha(1-R)+\gamma]\times L_b(\lambda,T); \text{ and}$$

calculating the ratio $\gamma/\alpha$ to minimize the variance of the $L_{b1}$ and the variance of the $L_{b2}$.

8. The method according to claim 6, wherein a sampling time interval between two adjacent sampling points is less than 2 microseconds when the first reflectivity sampling data $R_1$ is obtained; a sampling time interval between two adjacent sampling points is less than 2 microseconds when the first thermal radiation value sampling data $E_1$ is obtained; a sampling time interval between two adjacent sampling points is less than 2 microseconds when the second reflectivity sampling data $R_2$ is obtained; and a sampling time interval between two adjacent sampling points is less than 2 microseconds when the second thermal radiation value sampling data $E_2$ is obtained.

9. The method according to claim 6, wherein a difference between the wavelength $\lambda_1$ and the wavelength $\lambda_2$ ranges from 10 nm to 200 nm.

10. The method according to claim 6, wherein the temperature of the film is higher than or equal to 600 Celsius degree.

11. A method for controlling a temperature in a reaction chamber, comprising:

controlling a plurality of heating devices in the reaction chamber to operate according to a preset temperature, wherein the plurality of heating devices correspond to a plurality of detection areas of a film;

obtaining a reflectivity $R_{(i)}$ of the i-th sampling point in each of the plurality of detection areas of the film for light with a wavelength $\lambda$, and a thermal radiation value $E_{(i)}$ of the i-th sampling point, wherein i is a positive integer; and measuring multiple other sampling points in each of the plurality of detection areas of the film to obtain reflectivity sampling data R of the other sampling points in the detection area of the film for the light with the wavelength $\lambda$, and thermal radiation value sampling data E of the other sampling points, wherein $R_{(i)}$ and $E_{(i)}$ constitutes the i-th sampling data group;

obtaining a first correction factor $\alpha$ and a second correction factor $\gamma$, for each of the plurality of detection areas, according to values of at least two sampling data groups, wherein $0<\alpha\leq 1$, $0\leq\gamma\leq 1$;

obtaining a blackbody radiation value $L_b$ of each of the plurality of detection areas of the film for the light with the wavelength $\lambda$ according to the first correction factor $\alpha$, the second correction factor $\gamma$ and the values of the at least two sampling data groups; and obtaining a temperature T of each of the plurality of detection areas by looking up a table according to the blackbody radiation value $L_b$ and the wavelength $\lambda$; and comparing the temperatures of the plurality of detection areas, and if an abnormal temperature exists in the temperatures of the plurality of detection areas, regulating a heating device corresponding to a detection region corresponding to the abnormal temperature;

wherein the obtaining a first correction factor $\alpha$ and a second correction factor $\gamma$, for each of the plurality of detection areas, according to values of at least two sampling data groups comprises:

obtaining a ratio $\gamma/\alpha$ of the second correction factor $\gamma$ to the first correction factor $\alpha$ according to the values of the at least two sampling data groups; and calculating the first correction factor $\alpha$ and the second correction factor $\gamma$ according to the ratio $\gamma/\alpha$, the values of the at least two sampling data groups, and a radiation equation $$E=[\alpha(1-R)+\gamma]\times L_b(\lambda,T).$$

12. The method according to claim 11, wherein the obtaining a ratio $\gamma/\alpha$ of the second correction factor $\gamma$ to the first correction factor $\alpha$ according to the values of the at least two sampling data groups comprises:

calculating a variance of the blackbody radiation value $L_b$ according to the values of the at least two sampling data groups and a radiation equation $$E=[\alpha(1-R)+\gamma]\times L_b(\lambda,T);\text{ and}$$

selecting a value of the ratio $\gamma/\alpha$ to obtain a same blackbody radiation value $L_b$ in different sampling data groups.

* * * * *

UNITED STATES PATENT AND TRADEMARK OFFICE
CERTIFICATE OF CORRECTION

PATENT NO. : 9,696,209 B2
APPLICATION NO. : 14/333477
DATED : July 4, 2017
INVENTOR(S) : Lu Chen et al.

It is certified that error appears in the above-identified patent and that said Letters Patent is hereby corrected as shown below:

In the Specification (1) At Column 7, Line 2, the equation "$R+\tau+\delta 1$" should be changed to $-- R + \tau + \delta = 1 --$;

(2) At Column 10, Line 65, the equation "$E=[\alpha(1-R)+\gamma]\times L_b(\lambda,T)$," should be changed to $--E = P[\alpha(1-R)+\gamma]\times L_b(\lambda,T),--$;

(3) At Column 11, Line 45, the equation "$E=P[\alpha(1-R)+\gamma]\times L_{b1}$," should be changed to $--E_1 = P[\alpha(1-R_1)+\gamma]\times L_{b1},--$;

(4) At Column 11, Line 60, the equation "$\dfrac{\gamma}{\alpha} = \dfrac{-\sum \left(\dfrac{1-R_i}{E_i} - \hat{R}\right)\left(\dfrac{1}{E_i} - \hat{E}\right)}{\sum \left(\dfrac{1}{E_i} - \hat{E}\right)^2}$"

should be changed to $--\dfrac{\gamma}{\alpha} = \dfrac{-\sum (\dfrac{1-R_i}{E_i} - \hat{R})(\dfrac{1}{E_i} - \hat{E})}{\sum (\dfrac{1}{E_i} - \hat{E})^2} --$;

Signed and Sealed this
Seventeenth Day of October, 2017

*Joseph Matal*
Joseph Matal
*Performing the Functions and Duties of the*
*Under Secretary of Commerce for Intellectual Property and*
*Director of the United States Patent and Trademark Office*

(5) At Column 12, Line 21, the equation "$\frac{\gamma}{\alpha} = \frac{E_{12)}(1-R_{11)})-E_{11)}(1-R_{12)})}{E_{11)}-E_{12)}}.$" should be changed to -- $\frac{\gamma}{\alpha} = \frac{E_{1(2)}(1-R_{1(1)})-E_{1(1)}(1-R_{1(2)})}{E_{1(1)}-E_{1(2)}}$ --.